US 8,589,206 B2

(12) United States Patent
Boss et al.

(10) Patent No.: US 8,589,206 B2
(45) Date of Patent: Nov. 19, 2013

(54) SERVICE REQUESTS FOR MULTIPLE SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/755,971

(22) Filed: May 31, 2007

(65) Prior Publication Data

US 2008/0300942 A1 Dec. 4, 2008

(51) Int. Cl.
*G06Q 10/00* (2012.01)
(52) U.S. Cl.
USPC ....... 705/7.25; 705/7.22; 705/7.23; 705/7.11; 705/7.37; 705/37
(58) Field of Classification Search
None
See application file for complete search history.

(56) References Cited

U.S. PATENT DOCUMENTS

| 5,371,780 | A  | 12/1994 | Amitay |
|---|---|---|---|
| 6,006,194 | A  | 12/1999 | Merel |
| 6,236,981 | B1 | 5/2001  | Hill |
| 6,438,539 | B1 | 8/2002  | Korolev et al. |
| 6,550,881 | B1 | 4/2003  | Phillips |
| 6,553,568 | B1 | 4/2003  | Fijolek et al. |
| 6,678,700 | B1 | 1/2004  | Moore et al. |
| 6,732,140 | B1 | 5/2004  | McCue |
| 6,754,739 | B1 | 6/2004  | Kessler et al. |
| 6,842,899 | B2 | 1/2005  | Moody et al. |
| 6,859,927 | B2 | 2/2005  | Moody et al. |
| 6,925,493 | B1 | 8/2005  | Barkan et al. |
| 6,947,987 | B2 | 9/2005  | Boland |
| 6,968,323 | B1* | 11/2005 | Bansal et al. ............... 705/80 |
| 6,987,578 | B2 | 1/2006  | Alexander |
| 7,062,559 | B2 | 6/2006  | Yoshimura et al. |
| 7,099,681 | B2 | 8/2006  | O'Neill |
| 7,103,580 | B1 | 9/2006  | Batachia et al. |
| 7,103,847 | B2 | 9/2006  | Alford, Jr. et al. |
| 7,177,832 | B1* | 2/2007  | Semret et al. ............... 705/37 |
| 7,177,838 | B1 | 2/2007  | Ling |
| 7,222,345 | B2 | 5/2007  | Gray et al. |
| 7,249,099 | B2 | 7/2007  | Ling |
| 7,266,523 | B2 | 9/2007  | Depura et al. |

(Continued)

OTHER PUBLICATIONS

U.S. Appl. No. 11/756,360, Office Action dated Feb. 8, 2010, 13 pages.

(Continued)

*Primary Examiner* — Jonathan G Sterrett
*Assistant Examiner* — Tzu-Hsiang Lan
(74) *Attorney, Agent, or Firm* — Lisa Ulrich; Hoffman Warnick LLC

(57) ABSTRACT

A system, method, program product and service for processing a multiple service level bid in a resource management framework. A buyer's agent is provided to receive a multiple service level request from a business unit and query a resource unit broker for available resource types that can be utilized to provide at least some of the service level requirements of the multiple service level request. A mapping system is provided to map the available resource types to a list of resource sets (i.e., bidding options) and a prioritization system is provided to order the list. Once the list is ordered, a bidding system is provided to submit a bid for the highest priority resource set.

6 Claims, 3 Drawing Sheets

(56) References Cited

U.S. PATENT DOCUMENTS

| | | | |
|---|---|---|---|
| 7,401,035 | B1 | 7/2008 | Young |
| 7,634,430 | B2 | 12/2009 | Huberman et al. |
| 7,899,696 | B2 | 3/2011 | Boss et al. |
| 7,899,697 | B2 | 3/2011 | Boss et al. |
| 8,332,859 | B2 | 12/2012 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1 | 5/2003 | Semret et al. |
| 2003/0101124 | A1* | 5/2003 | Semret et al. .......... 705/37 |
| 2003/0167329 | A1 | 9/2003 | Kurakake et al. |
| 2003/0216971 | A1 | 11/2003 | Sick et al. |
| 2004/0010592 | A1 | 1/2004 | Carver et al. |
| 2004/0024687 | A1* | 2/2004 | Delenda .................. 705/37 |
| 2004/0059646 | A1 | 3/2004 | Harrington et al. |
| 2004/0083160 | A1 | 4/2004 | Byde et al. |
| 2004/0111308 | A1* | 6/2004 | Yakov .................... 705/8 |
| 2004/0133506 | A1 | 7/2004 | Glodjo et al. |
| 2004/0133609 | A1 | 7/2004 | Moore et al. |
| 2004/0230317 | A1* | 11/2004 | Kumar et al. ............ 700/1 |
| 2005/0055306 | A1 | 3/2005 | Miller et al. |
| 2005/0071182 | A1* | 3/2005 | Aikens et al. ........... 705/1 |
| 2005/0138621 | A1 | 6/2005 | Clark et al. |
| 2005/0141554 | A1 | 6/2005 | Hammarlund et al. |
| 2005/0144115 | A1 | 6/2005 | Brett |
| 2005/0192865 | A1 | 9/2005 | Boutilier et al. |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1 | 12/2005 | Friesen |
| 2005/0289043 | A1 | 12/2005 | Maudlin |
| 2006/0047550 | A1 | 3/2006 | Dineen et al. |
| 2006/0069621 | A1 | 3/2006 | Chang et al. |
| 2006/0080210 | A1 | 4/2006 | Mourad et al. |
| 2006/0080224 | A1 | 4/2006 | Schuelke |
| 2006/0080438 | A1 | 4/2006 | Storrie |
| 2006/0149652 | A1 | 7/2006 | Fellenstein et al. |
| 2006/0167703 | A1 | 7/2006 | Yakov |
| 2006/0195386 | A1 | 8/2006 | Glodjo et al. |
| 2007/0087756 | A1* | 4/2007 | Hoffberg ................. 455/450 |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 | 4/2008 | Gates et al. |

OTHER PUBLICATIONS

U.S. Appl. No. 11/756,325, Office Action dated Feb. 2, 2010, 10 pages.

U.S. Appl. No. 11/755,985, Office Action, dated Jan. 29, 2010, 19 pages.

U.S. Appl. No. 11/756,426, filed May 31, 2007, Final Office Action dated Mar. 24, 2010, 20 pages.

U.S. Appl. No. 11/756,416, filed May 31, 2007, Final Office Action dated Mar. 24, 2010, 14 pages.

U.S. Appl. No. 11/756,400, filed May 31, 2007, Final Office Action dated Mar. 24, 2010, 20 pages.

U.S. Appl. No. 11/756,386, filed May 31, 2007, Final Office Action dated Mar. 24, 2010, 14 pages.

U.S. Appl. No. 11/756,426, Advisory Action dated Jun. 8, 2010, 3 pages.

U.S. Appl. No. 11/756,400, Advisory Action dated Jun. 8, 2010, 3 pages.

U.S. Appl. No. 11/756,360, Notice of Allowance and Fees Due dated May 19, 2010, 6 pages.

Boss et al, U.S. Appl. No. 11/756,325, Office Action Communication, Apr. 27, 2009, 10 pages.

Boss et al, U.S. Appl. No. 11/756,360, Office Action Communication, Apr. 24, 2009, 12 pages.

Boss et al, U.S. Appl. No. 11/755,985, Office Action Communication, Apr. 1, 2009, 23 pages.

Duermeyer, Karin, "Methodology: From Component Business Model to Service Oriented Architecture", IBM Business Consulting Services, Nuernberger Kreis—Softwaretag: 7, May 2004, 41 pages.

U.S. Appl. No. 11/756,325, filed May 31, 2007, Notice of Allowance and Fees due dated Jul. 14, 2010, 10 pages.

U.S. Appl. No. 11/755,985, filed May 31, 2007, Final Office Action dated Jul. 1, 2010, 23 pages.

U.S. Appl. No. 11/756,416, filed May 31, 2007, Notice of Allowance and Fees due dated Jun. 30, 2010, 4 pages.

U.S. Appl. No. 11/756,313, filed May 31, 2007, Office Action dated Jun. 29, 2010, 31 pages.

U.S. Appl. No. 11/756,386, filed May 31, 2007, Notice of Allowance and Fees due dated Jun. 29, 2010, 4 pages.

U.S. Appl. No. 11/756,400, filed May 31, 2007, Office Action dated Jun. 24, 2010, 12 pages.

U.S. Appl. No. 11/756,426, filed May 31, 2007, Office Action dated Jun. 24, 2010, 10 pages.

Ozsomer et al., "A Resource-Based Model of Market Learning in the Subsidiary: The Capabilities of Exploration and Exploitation", Journal of International Marketing, vol. 11, No. 3, 2003.

Staudenmayer, Nancy, "Interdependency: Conceptual, Empirical, and Practical Issues", The International Center for Research on the Management of Technology, Jun. 1997.

Boss, U.S. Appl. No. 11/756,386, Office Action Communication, Oct. 8, 2009, 13 pages.

Boss, U.S. Appl. No. 11/756,400, Office Action Communication, Oct. 8, 2009, 18 pages.

Carter, Candice D., U.S. Appl. No. 11/756,426, filed May 31, 2007, Notice of Allowance and Fees Due dated Oct. 20, 2010, 27 pages.

Gregg, Mary M., U.S. Appl. No. 11/755,985, filed May 31, 2007, Office Action dated Oct. 20, 2010, 27 pages.

Carter, Candice II, U.S. Appl. No. 11/756,400, filed May 31, 2007, Notice of Allowance and Fees Due dated Oct. 19, 2010, 26 pages.

Nguyen, Nga, B., U.S. Appl. No. 11/756,406, filed May 31, 2007, Office Action dated Aug. 17, 2010, 32 pages.

Boss, U.S. Appl. No. 11/756,360, Office Action Communication, Oct. 14, 2009, 13 pages.

Boss, U.S. Appl. No. 11/756,325, Office Action Communication, Oct. 13, 2009, 12 pages.

Boss, U.S. Appl. No. 11/756,416, Office Action Communication, Oct. 14, 2009, 16 pages.

Boss, U.S. Appl. No. 11/755,985, Office Action Communication, Nov. 2, 2009, 16 pages.

Boss, U.S. Appl. No. 11/756,426, Office Action Communication, Oct. 29, 2009, 20 pages.

Araque Jr., Gerardo, U.S. Appl. No. 11/756,313, filed May 31, 2007, Office Action dated Mar. 25, 2011, 33 pages.

Rankins, William E, U.S. Appl. No. 11/756,374, filed May 31, 2007, Office Action dated Mar. 11, 2011, 17 pages.

Nguyen, Nga B., U.S. Appl. No. 11/756,406, filed May 31, 2007, Final Office Action dated Feb. 22, 2011, 15 pages.

Garg, Yogesh C., U.S. Appl. No. 11/756,442, filed May 31, 2007, Office Action dated Feb. 10, 2011, 35 pages.

Mahapatra et al., "Oracle Parallel Processing", Copyright 2000, O'Reilly & Associates.

Araque Jr., Gerardo, U.S. Appl. No. 11/756,313, filed May 31, 2007, Final Office Action dated Dec. 10, 2010.

Rankins, William E, U.S. Appl. No. 11/756,374, filed May 31, 2007, Office Action dated Oct. 29, 2010. 35 pages.

Araque, Jr., U.S. Appl. No. 11/756,313, Office Action Communication, Aug. 29, 2011, 37 pages.

(56) References Cited

OTHER PUBLICATIONS

Garg, U.S. Appl. No. 11/756,442, Notice of Allowance & Fees Due, Sep. 12, 2011, 16 pages.
Wai, U.S. Appl. No. 11/756,357, Office Action Communication, Nov. 10, 2011, 17 pages.
Nguyen, U.S. Appl. No. 11/456,406, Notice of Allowance and Fees Due, 19 pages.
Gregg, U.S. Appl. No. 11/755,985, Office Action Communication, Dec. 2, 2011, 75 pages.
Wai, U.S. Appl. No. 11/756,367, Office Action Communication, Dec. 9, 2011, 19 pages.
Rankins, U.S. Appl. No. 11/756,374, Notice of Allowance and Fees Due, Dec. 16, 2011, 22 pages.
Gaudiano et al., "Dynamic Resource Allocation for a Sensor Network", Manuscript #335, Jun. 1, 2005, 21 pages.
Glass, "Creating Socially Conscious Agents: Decision-Making in the Context of Group Commitments", Computer Science Group, Harvard University, Apr. 1999, 33 pages.
Chew, U.S. Appl. No. 11/755,980, Office Action Communication, Dec. 20, 2011, 32 pages.
Rankins, U.S. Appl. No. 11/756,374, Office Action Communication, Aug. 19, 2011, 19 pages.
Gregg, U.S. Appl. No. 11/755,985, Office Action Communication, May 5, 2011, 35 pages.
The University of Melbourne: Annual Budget 2004, 84 pages: www.unimelb.edu.au/publications/docs/budget2004.pdf.
Carter, U.S. Appl. No. 11/756,416, Notice of Allowance & Fees Due, May 17, 2011, 19 pages.
Garg, U.S. Appl. No. 11/756,442, Office Action Communication, Jun. 24, 2011, 8 pages.
Carter, U.S. Appl. No. 11/756,360, Notice of Allowance & Fees Due, May 20, 2011, 19 pages.
Carter, U.S. Appl. No. 11/756,386, Notice of Allowance & Fees Due, May 23, 2011, 19 pages.
Wai, U.S. Appl. No. 11/756,357, Office Action Communication, May 20, 2011, 32 pages.
Wai, U.S. Appl. No. 11/756,367, Office Action Communication, Jun. 13, 2011, 38 pages.
Nisan, "Bidding and Allocation in Combinatorial Auctions", Proceedings of the 2nd ACM Conference on Electronic Commerce, 2000, 12 pages.
Chew, U.S. Appl. No. 11/755,980, Office Action Communication, Jun. 23, 2011, 50 pages.
Chew, U.S. Appl. No. 11/755,980, Notice of Allowance & Fees Due, Aug. 6, 2012, 18 pages.
Chew, U.S. Appl. No. 13/571,904, Office Action, Mar. 28, 2013, 32 pages.
Chew, U.S. Appl. No. 13/571,904, Notice of Allowance & Fees Due, Sep. 27, 2013, 11 pages.

* cited by examiner

SERVICE REQUESTS FOR MULTIPLE SERVICE LEVEL CHARACTERISTICS

CROSS-REFERENCE TO RELATED APPLICATIONS

This application is related in some aspects to commonly owned patent application Ser. No. 11/756,367, entitled "RESOURCE MANAGEMENT FRAMEWORK", filed concurrently herewith, the entire contents of which are herein incorporated by reference.

FIELD OF THE INVENTION

The present invention generally relates to processing bids in a resource management framework. Specifically, the present invention relates to the processing of multiple service level requests in a resource management framework.

BACKGROUND OF THE INVENTION

Businesses are experiencing an ever-increasing trend to achieve higher utilization of computing resources. Companies that provide their own Information technology (IT) computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). To this extent, none of the existing approaches address how many resources a particular party is allowed to consume. That is, none of the existing approaches provides a way to adequately ration computational resources to a party in a way that will fulfill its needs, while not preventing the needs of other parties from being met.

This problem is further exacerbated by the fact that an entity may need to secure a resource capable of delivering multiple service level requirements, e.g., an entity may need a resource at 99.9% availability and a response time of less than N seconds. Current approaches lack the ability to efficiently and easily service such compound requests. The result is that multiple requests must be made, which leads not only to an inefficient use of resources, but also to the potential for a non-optimal set of resource types being provisioned. Accordingly, there exists a need in the art to overcome the deficiencies and limitation described herein above.

SUMMARY OF THE INVENTION

Aspects of this invention describe a system and method to provide the ability to bid on multiple service level requirements in a single exchange. Thus, for example, an entity could bid on scalability, support, security and performance service levels in a single exchange, thus ensuring that the winner of a bid obtains the right type of service level for each requirement.

One aspect of the present invention provides a method for processing a multiple service level bid in a resource management framework, comprising: receiving a multiple service level request, wherein the multiple service level request includes a plurality of service level requirements; querying a resource broker for available resource types that can be utilized to provide at least some of the service level requirements of the multiple service level request; mapping the available resource types to a list of resource sets, wherein each resource set meets the service level requirements of the multiple service level request; prioritizing the list of resource sets; and submitting a bid to the resource broker, wherein the bid is for a resource set having a highest priority.

Another aspect of the present invention provides a system for processing a multiple service level bid in a resource management framework, comprising: a system for receiving a multiple service level request, wherein the multiple service level request includes a plurality of service level requirements; a system for querying a resource broker for available resource types that can be utilized to provide at least some of the service level requirements of the multiple service level request; a system for mapping the available resource types to a list of resource sets, wherein each resource set meets the service level requirements of the multiple service level request; a system for prioritizing the list of resource sets; and a system for submitting a bid to the resource broker, wherein the bid is for a resource set having a highest priority.

Another aspect of the present invention provides a program product stored on a computer readable medium for processing a multiple service level bid in a resource management framework, the computer readable medium comprising program code for causing a computer system to: receive a multiple service level request, wherein the multiple service level request includes a plurality of service level requirements; query a resource broker for available resource types that can be utilized to provide at least some of the service level requirements of the multiple service level request; map the available resource types to a list of resource sets, wherein each resource set meets the service level requirements of the multiple service level request; prioritize the list of resource sets; and submit a bid to the resource broker, wherein the bid is for a resource set having a highest priority.

Another aspect of the present invention provides computer software embodied in a propagated signal for submitting a multiple service level bid to a resource management framework, the computer software comprising instructions for causing a computer system to: receive a multiple service level request, wherein the multiple service level request includes a plurality of service level requirements; query a resource broker for available resource types that can be utilized to provide at least some of the service level requirements of the multiple service level request; map the available resource types to a list of resource sets, wherein each resource set meets the service level requirements of the multiple service level request; prioritize the list of resource sets; and submit a bid to the resource broker, wherein the bid is for a resource set having a highest priority.

Another aspect of the present invention provides a method for deploying a system for processing a multiple service level bid in a resource management framework: providing a computer infrastructure being operable to: receive a multiple service level request, wherein the multiple service level request includes a plurality of service level requirements; query a resource broker for available resource types that can be utilized to provide at least some of the service level requirements of the multiple service level request; map the available resource types to a list of resource sets, wherein each resource set meets the service level requirements of the multiple service level request; prioritize the list of resource sets; and submit a bid to the resource broker, wherein the bid is for a resource set having a highest priority.

Another aspect of the present invention provides a data processing system for submitting a multiple service level bid to a resource management framework, comprising: a processing unit, a bus coupled to the processing unit, a memory medium coupled to the bus, the bus comprising instructions, which when executed by the processing unit cause the data processing system to: receive a multiple service level request, wherein the multiple service level request includes a plurality of service level requirements; query a resource broker for available resource types that can be utilized to provide at least some of the service level requirements of the multiple service level request; map the available resource types to a list of resource sets, wherein each resource set meets the service level requirements of the multiple service level request; prioritize the list of resource sets; and submit a bid to the resource broker, wherein the bid is for a resource set having a highest priority.

BRIEF DESCRIPTION OF THE DRAWINGS

These and other features of this invention will be more readily understood from the following detailed description of the various aspects of the invention taken in conjunction with the accompanying drawings in which.

Figure 1:
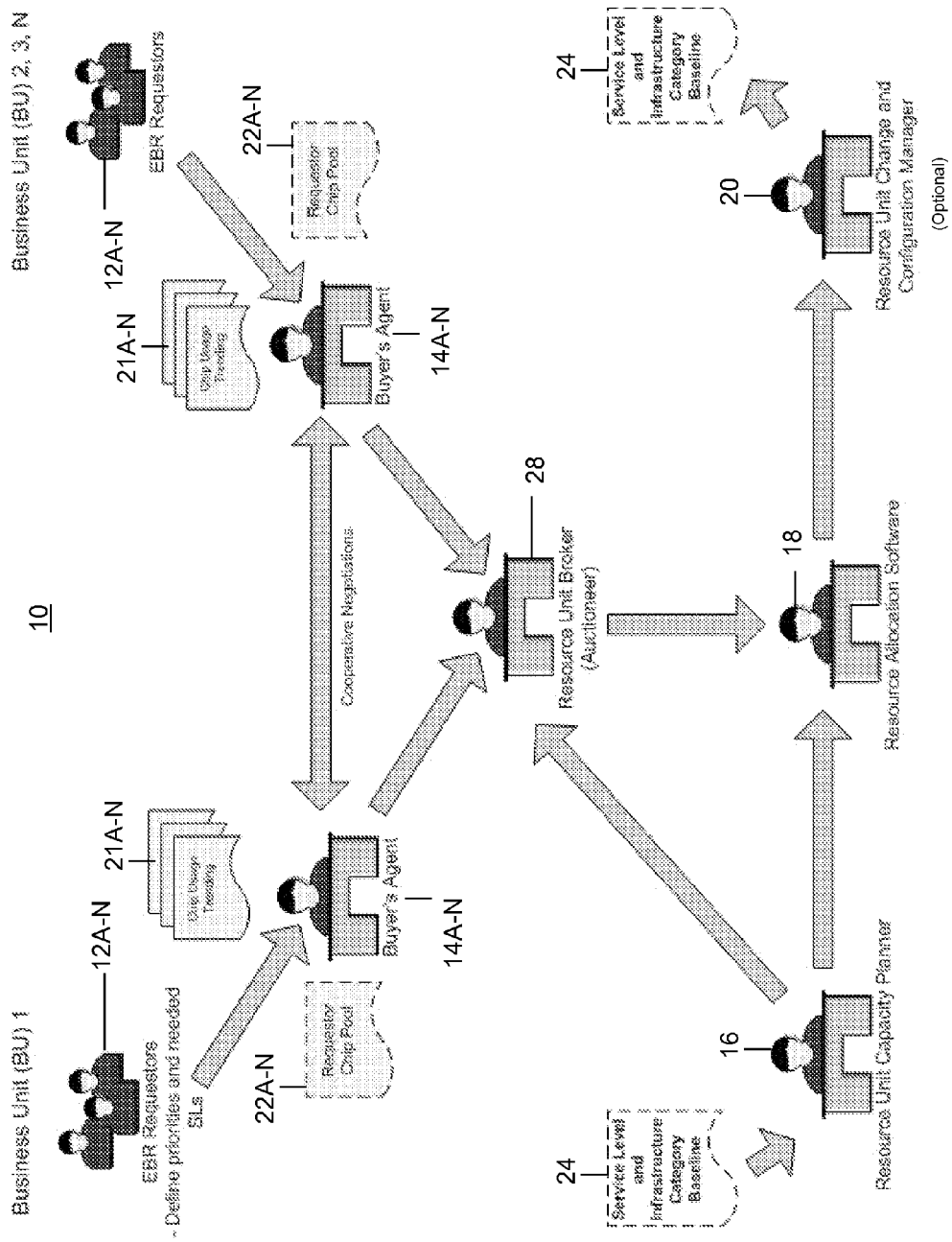
FIG. 1 shows an illustrative resource management framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Process Flow
III. Computerized Implementation
I. General Description As used herein, the following terms have the following definitions:

"Chip" means any unit (virtual or otherwise) that may be exchanged for resources such as information technology (IT) resources.

"Party" means any individual, group of individuals, department, business unit, cell of a component business model, etc.

"Discrete Event" means a scheduled event such as an auction.

"Fluid Event" means any non-scheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc.) sought by a party to accomplish objectives.

"Service Level Agreement (SLA)" means an agreement among a set of parties to provide a certain level of IT services from a first party to a second party.

As indicated above, this invention describes (among other things) an application of resource unit brokering algorithms, chip management methods for automated brokering, chip management methods for live brokering, and chip allocation methods to the brokering of operational support characteristics of service level management within an enterprise. Typically, the operational support characteristics are derived from known capacity values that are provided by configuration managers. Calculations are made on the capacity values and maximum quantities of the availability resource units are provided to resource brokers for spot or periodic sale and auction to one or more buyers' agents. Among other things, this application describes the offering of operational support service level characteristics for sale or auction in a Service Level and IT Resource Optimization framework.

Each service level category within a service level management framework can be decomposed into numerous component building blocks that tie into the sundry infrastructure categories within the IT infrastructure. These infrastructure categories include the storage subsystems, storage networks, servers or hosts, local area networks, operating systems and applications. It is understood that there can be other infrastructure categories depending upon how the infrastructure components of IT are decomposed.

The existence of certain components or quantities of components in each infrastructure category will predicate the ability to provide a particular service or provide differing service levels of the service. These components can be expressed typically in terms of capacities, assets, personnel and configurations. It is these constituent capacities, assets, personnel and configurations that are grouped and offered to aid in the support of a particular service level. It is not necessarily the intention of this application to discuss the groups that comprise a particular service level. Rather, this application describes the need for these groups and how multiple groups of capacities, assets, personnel and configurations are required to define service levels. The constituent capacities, assets, personnel and configurations each have unique enablers that allow them to fit into the overall Service Level and IT Resource Optimization framework. This application describes (among other things) the methods and process to take a suggested grouping of constituent capacities, assets, personnel and configurations as they relate to a operational support service category and enable them to be sold, bartered and/or auctioned in a Service Level and IT Resource Optimization framework.

Referring now to FIG. 1, a resource management framework (hereinafter framework 10) is depicted as described in which was cross-referenced and incorporated above. This framework is typically leveraged under the present invention, and hence, is being shown and described in conjunction with FIG. 1. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip usage trending 21A-N, requester chip pool 22A-N, and service level and infrastructure category baseline 24.

An objective of framework 10 is to reach a means of maximizing utilization of IT Resources among competing consumers such as business units 12A-N by distribution of the decision making/allocation process according to relative needs of applications. Doing so eliminates the need for traditional service level agreements (SLAs), and allows each business unit 12A-N to make dynamic "free market" decisions as to how best to obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business unit's 12A-N behalf. Various methods can be employed by the resource unit broker 28 to fulfill requests for resources to consumers or business units 12A-N. Methods include the use of non-depleting chips, the use of discrete chips, the use of fluid chips, etc. Regardless, the buyers' agents 14A-N understand the thresholds business units 12A-N are willing to pay, their associated targets for various service level characteristics, and will programmatically employ the most advantageous bidding strategy.

The resource unit capacity planner 16 reports to resource unit brokers 28 (e.g., auctioneers) what resources are available (e.g., infrastructure components) at any given time. Resource allocation software 18 includes products such as Enterprise Workload Manager (EWLM)™, WebSphere® XD, and Partition Load Manager™. The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by optional resource unit change and configuration manager 20.

As indicated above, the present invention involves the ability to bid on multiple service level characteristics for a given resource (or set of resources) in a single exchange. This thus allows buyer's agent 14A-N to collect multiple service level characteristics from a business unit 12A-N and have the multiple service level characteristics match a resource (or set of resources) that can be won during a bidding session. Described below is a process that allows the buyer's agent 14A-N to perform a mapping such that the bidding session only needs to occur one time. The winning resource(s) inherits each of the required service level characteristics.

In general, bidding is done using chips allocated to parties such as business units 12A-N. That is, business units 12A-N will be allocated a certain quantity of chips pursuant to a business transaction (e.g., a financial transaction). Those chips can then be used for bidding in an attempt to be allocated computational resources.

Consider, for the sake of simplicity, the case where only two business units 12A-N are competing for IT resources. These business units 12A-N will be known simply as BU1 and BU2, and each is represented by its own respective agent 14A-N. In the discrete chip model, again, periodic auctions are held, and winners determined for the duration of the allocation cycle, such that resources are distributed accordingly. Specifically, agents 14A-N will submit bids on behalf of business units 12A-N. Each bid is for an amount (e.g., one or more) of chips that were allocated to business units 12A-N. It should be noted that each business unit 12A-N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined herein.

II. Process Flow

Figure 2:
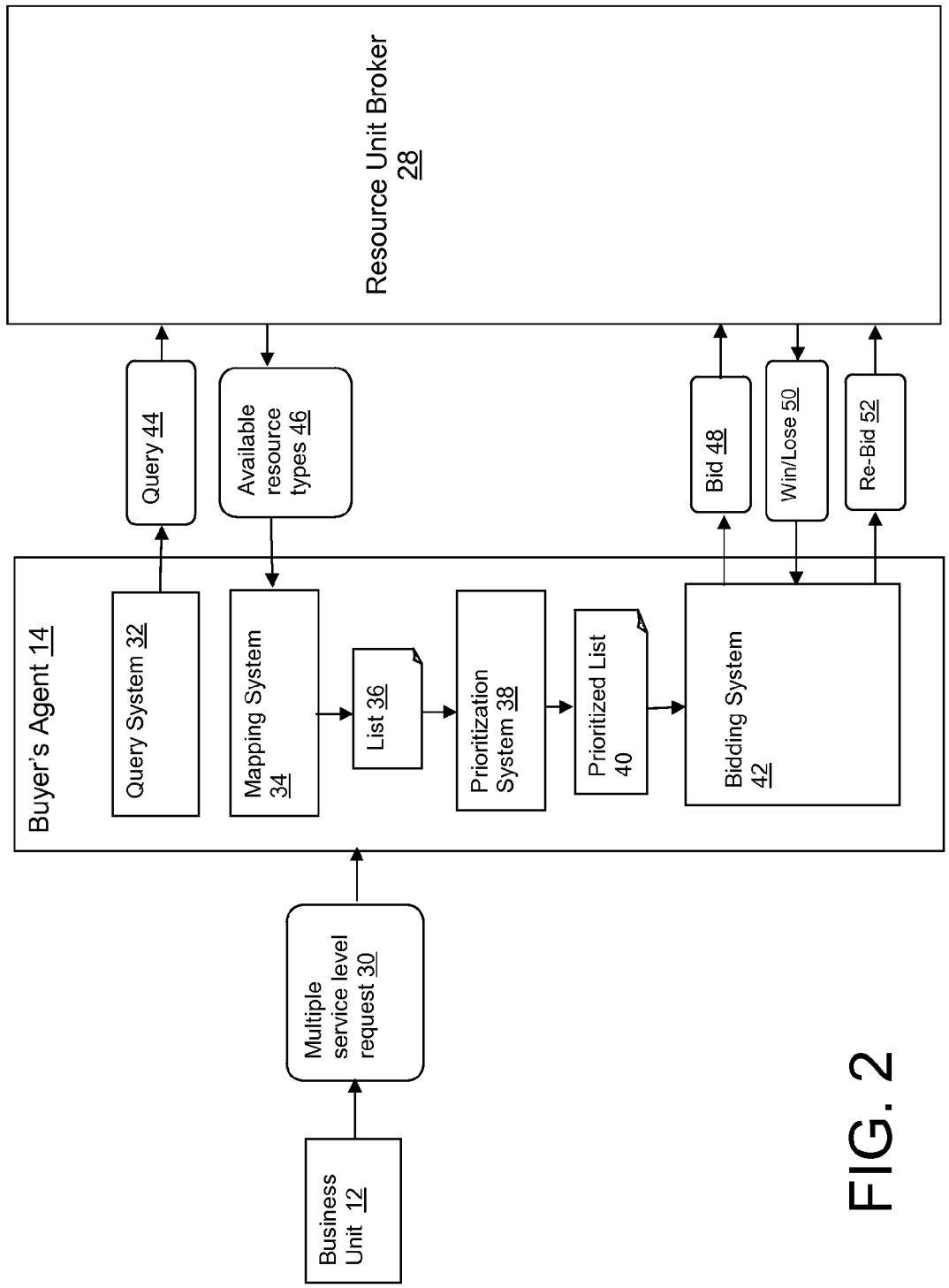
FIG. 2 depicts a process flow diagram according to the present invention.

Referring now to FIG. 2, a process flow diagram is depicted that shows the interaction between a business unit 12 (or any other participating entity) and a buyer's agent 14 for handling a bid having multiple service levels. The process begins with business unit 12 submitting a multiple service level request 30 to a buyer's agent 14. A multiple service level request 30 comprises any type of request for resources that specifies more than one service level characteristic. Illustrative service level characteristics may include any type of characteristic germane to computing and information technology (IT) services, e.g., scalability, support, security, performance, memory, etc. For example, business unit 12 may want to bid on a resource that adheres to three separate service levels including: (1) a 99% availability; (2) a throughput of 100 transactions/second; and (3) a high level of support, e.g., in which incidents are responded to within two hours.

Once the buyer's agent 14 receives the multiple service level request 30, a query system 32 is utilized to submit a query 44 to a resource unit broker 28 to identify all available resource types 46 that could possibly be utilized to fulfill some or all of the request 30, i.e., that alone or in combination inherit all required service level characteristics.

Assume that in the above example involving three service level characteristics, a resource unit broker 28 returned a set of four available resource types 46 available for bidding, including:

a—Resource type (1), a windows server that is 99% available and can manage 50 transactions per second. The cost to win this resource is at least 100 chips;
b—Resource type (2), a windows server that is 97% available and can manage 100 transactions per second. The cost to win this resource is at least 100 chips;
c—Resource type (3), a windows server that is 99% available and can manage 200 transactions per second. The cost to win this resource is at least 500 chips; and
d—Resource type (4), a windows server that is 99% available and can manage 100 transactions per second. The cost to win this resource is at least 300 chips.

The resource unit broker 28 may also have three service level types for support, including:

a—Support Service (1) Bronze level of service—requests can be executed in less than four hours;
b—Support Service (2) Silver level of service—requests can be executed in less than three hours; and
c—Support Service (3) Gold level of service—requests that can be executed in less than two hours.

Once the different available resource types 46 are returned, they are fed to a mapping system 34 that automatically generates a list 36 of bidding options or "resource sets." A resource set comprises one or more resource types that meet the required service levels. Thus, although resource unit broker 28 returned four available resource types 46 for bidding, it may be the case that none exactly meet the requirements. Thus, mapping system 34 can look for combinations of the available resource types 46 that can meet the multiple service level requirements. Thus, list 36 may include more or fewer bidding options than the number of available resource types 46. Note that in this example, support services are independent of the resource types, so no mapping is required for the support services. Instead, the appropriate support type is simply incorporated into the bid by bidding system 42 (described herein).

In the above example, it may at first appear that the resource type that best fulfills the first two service levels, namely availability of 99% and throughput of 100 transactions/second, would be Resource type (4), at a cost of at least 300 chips. Mapping system 34 however not only looks at the individual resource types that are returned, but also considers combinations of resource types that could be utilized to fulfill the service levels. Accordingly, mapping system 34 generates a list 36 of bidding options that can achieve or exceed each of the desired service levels.

For example, given the available resources 46 described in the above example, mapping system 34 may identify a list 36 of four different resource sets (i.e., bidding options) to meet the required service levels.

I. Two resources of type (1) running independently would allow a combined availability of 99% and will be able to manage 100 transactions (50 each) at a cost of at least 2×100=200 chips.

II. Two resources of type (2) running in an active/standby cluster would allow a combined availability of 1−(0.03×0.03)= 99.9% availability (simple availability formula of two resources in parallel). The number of transactions per second would be 100 transactions per second (as only one machine is running at any one time). Total cost=at least 2×100=200 chips.

III. One resource of type (3) stand-alone at a cost of at least 500 chips, but exceeding the number of transactions per second.

IV. One resource of type (4) stand-alone at a cost of at least 300 chips.

Once the list 36 is generated, prioritization system 38 is used to order the resource sets to determine an order in which resource sets should be bid on. Ordering may be done using any methodology. For instance, ordering may be based on: (1) the lowest likely cost; (2) the chance that the resource set can be won at the lowest bid amount possible (based on previous history of bidding on that resource); (3) the shortest time to provision the resource, etc.

Once the prioritized list 40 is generated, bidding system 42 can then submit a single bid 48 to meet each of the required service levels. For example, assume that it is likely that two resources of type (2) at a cost of at least 200 chips is the most effective resource set because the time to provision two stand-alone machines is faster than the time to implement an active/standby cluster arrangement. The bidding system 42 then also considers the third service level, i.e., support. Support was not considered during the mapping/prioritization of the resource types because, in this example, the level of support is an independent service level that has no dependency on the resources provisioned. Therefore, the bid 48 for a resource set takes the shape of:

BID TYPE=WINNER TAKES ALL
BID RESOURCES=2×RESOURCE OF TYPE (2)
BID SUPPORT=GOLD LEVEL OF SERVICE

This bid 48 is then sent to the resource unit broker 28 for a bidding session to start. The resource unit broker 28 takes this atomic set of criteria and manages the bidding on the two resources of type (2) and a gold level of service. If the bid 48 is successful, the business unit 12 receives the combination of resources that fulfill all service requirements. If the bid 48 is not successful (e.g., as indicated by win/lost indicator 50), the bidding system 42 may submit a re-bid 52 on the same resource types at a higher chip amount or opt to bid on a different combination—for example, one resource of type (3) and the gold level of support service.

This approach provides numerous advantages including: the ability for a business unit 12 to bid on multiple service level requirements in one bid cycle; the ability for the buyer's agent 14 to perform automatic mapping of available resource types to a number of resource sets (i.e., bidding options); and the ability for an 'all or nothing' approach where the winning bid will guarantee that all service levels can be met (or exceeded), thus solving the problem of winning a resource that does not quite meet all of the requirements—especially if more than one resource is needed to meet all requirements.

III. Computerized Implementation

Figure 3:
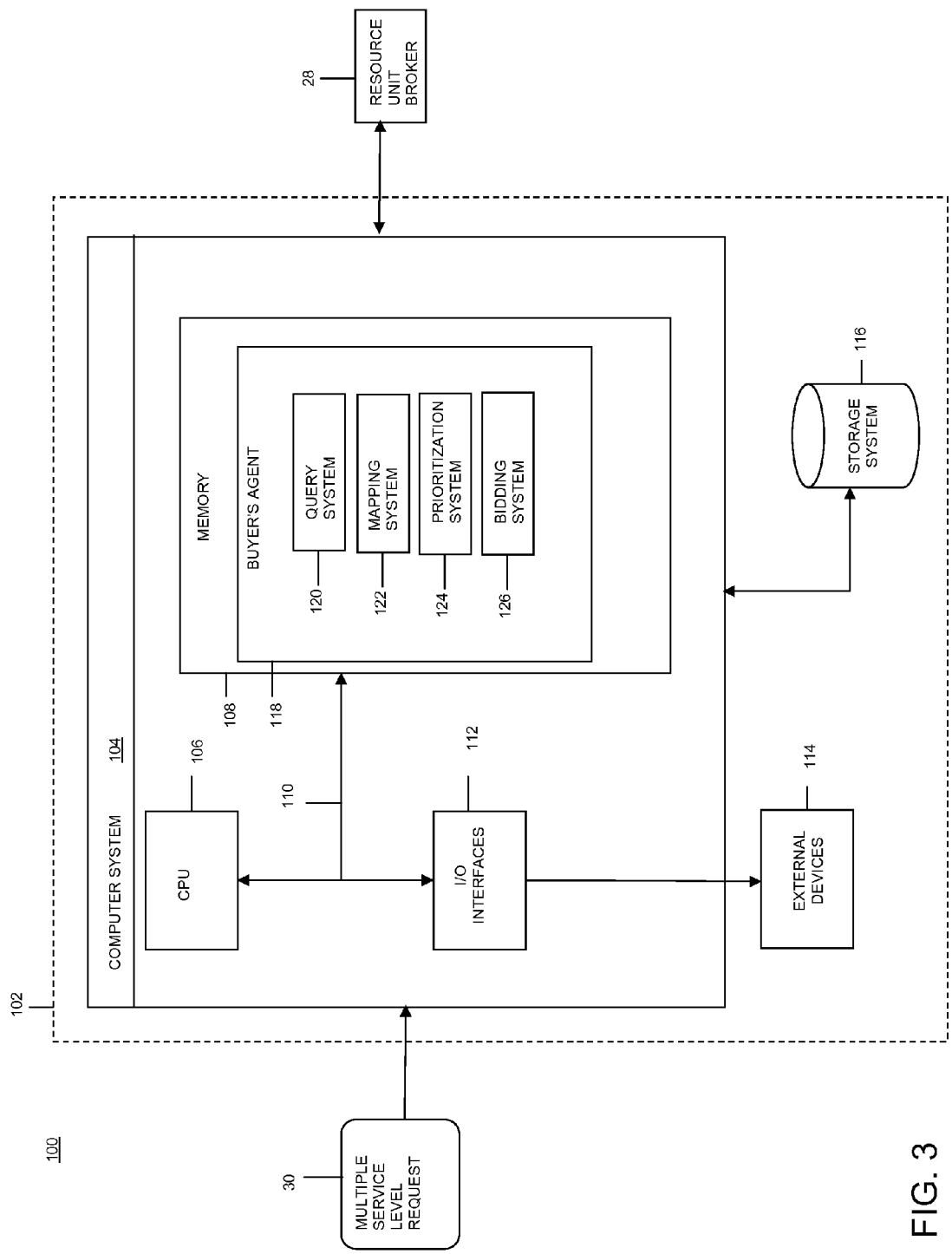
FIG. 3 shows a more detailed computerized implementation of the present invention.

Referring now to FIG. 3, a more detailed diagram of a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as operational support program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the process(es) of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 3 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104. It should be understood computer system 104 could be any combination of human, hardware and/or software. It is shown as such to illustrate the functions as described herein. To this extent, the functions of computer system 104 could be provided by any of the components of FIG. 1 (e.g., agents 14A-N, resource unit broker 28, etc.).

Shown in memory 108 of computer system 104 is buyer's agent 118, which facilitates the functions as described herein. It should be understood resource unit broker 28 can provide any of the functions described in the above-incorporated applications. As depicted, buyer's agent 118 includes query system 120, mapping system 122, prioritization system 124, and bidding system 126. It should be understood that this configuration of functionality is intended to be illustrative only, and that identical or similar functionality could be provided with a different configuration of systems.

In any event, buyer's agent 118 facilitates the functions as described herein. Specifically, query system 120 is configured to query resource unit broker 28 for available resource types that could be bid on and help fulfill at least some of the requirements of multiple service level request 30. Mapping system 122 maps the available resource types to a list of resource sets that if bid on and won, would fulfill the requirements of multiple service level request 30. Prioritization system 124 orders the list of resource sets. Bidding system 126 submits the bid to the resource unit broker 28.

While shown and described herein as a method and system for submitting and processing a multiple service level request, it is understood that the invention further provides various alternative embodiments. For example, in one embodiment, the invention provides a computer-readable/useable medium that includes computer program code to enable a computer infrastructure to process multiple service level requests. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to process a multiple service level request. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for processing a multiple service level request. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for processing a multiple service level bid in a resource management framework performed using at least one computing device, the method comprising:
   receiving a multiple service level request,
   wherein the multiple service level request includes a plurality of service level requirements associated with a corresponding group of resource types, and
   wherein the group of resource types includes server availability, throughput and response time;
   querying a resource broker for available resource types that can be utilized to provide at least some of the service level requirements associated with the group of resource types of the multiple service level request;
   mapping the available resource types to a list of resource sets using the at least one computing device,
   wherein each resource set includes at least one of the available resource types, and
   wherein each resource set meets at least one of the service level requirements of the multiple service level request;
   prioritizing the list of resource sets based upon a likelihood of successfully winning each respective resource set at a minimum bid amount;
   submitting a bid to the resource broker,
   wherein the bid is for a resource set having a highest priority is determined based upon the prioritizing;
   submitting a re-bid if the bid fails to win the resource set,
   wherein the re-bid comprises a higher bid amount than the failed bid,
   wherein the re-bid comprises a new bid on a next highest priority resource set in the list of resource sets, and
   wherein the re-bid is based upon a re-prioritized set of resource sets,
   wherein the re-prioritized set of resource sets is prioritized based upon a shortest provisioning time for each respective resource set.

2. The method of claim 1, wherein the plurality of service level requirements are selected from the group consisting of: scalability, support, security, performance, and memory.

3. A computerized system for processing a multiple service level bid in a resource management framework, comprising:
   at least one computing device for performing a method comprising:
      receiving a multiple service level request,
      wherein the multiple service level request includes a plurality of service level requirements associated with a corresponding group of resource types, and
      wherein the group of resource types includes server availability, throughput and response time;
      querying a resource broker for available resource types that can be utilized to provide at least some of the service level requirements associated with the group of resource types of the multiple service level request;
      mapping the available resource types to a list of resource sets,
      wherein each resource set includes at least one of the available resource types, and wherein each resource set meets at least one of the service level requirements of the multiple service level request;
      prioritizing the list of resource sets based upon a likelihood of successfully winning each respective resource set at a minimum bid amount;
      submitting a bid to the resource broker,
      wherein the bid is for a resource set having a highest priority determined based upon the prioritizing;
      submitting a re-bid if the bid fails to win the resource set,
      wherein the re-bid comprises a higher bid amount than the failed bid,
      wherein the re-bid comprises a new bid on a next highest priority resource set in the list of resource sets, and
      wherein the re-bid is based upon a re-prioritized set of resource sets,
      wherein the re-prioritized set of resource sets is prioritized based upon a shortest provisioning time for each respective resource set.

4. The computerized system of claim 3, wherein the plurality of service level requirements are selected from the group consisting of: scalability, support, security, performance, and memory.

5. A program product stored on a non-transitory computer readable medium for processing a multiple service level bid in a resource management framework, the computer readable medium comprising program code for causing a computer system to:
   receive a multiple service level request, wherein the multiple service level request includes a plurality of service level requirements associated with a corresponding group of resource types,
   wherein the group of resource types includes server availability, throughput response time;
   query a resource broker for available resource types that can be utilized to provide at least some of the service level requirements associated with the group of resource types of the multiple service level request;
   map the available resource types to a list of resource sets,
   wherein the each resource set includes at least one of the available resource types, and
   wherein each resource set meets at least one of the service level requirements of the multiple service level request;
   prioritize the list of resource sets based upon a likelihood of successfully winning each respective resource set at a minimum bid amount;
   submit a bid to the resource broker,
   wherein the bid is for a resource set having a highest priority determined based upon the prioritizing;
   submitting a re-bid if the bid fails to win the resource set,
   wherein the re-bid comprises a higher bid amount than the failed bid,
   wherein the re-bid comprises a new bid on a next highest priority resource set in the list of resource sets, and
   wherein the re-bid is based upon a re-prioritized set of resource sets,
   wherein the re-prioritized set of resource sets is prioritized based upon a shortest provisioning time for each respective resource set.

6. The program product of claim 5, wherein the plurality of service level requirements are selected from the group consisting of: scalability, support, security, performance, and memory.

* * * * *